(12) United States Patent
Tao et al.

(10) Patent No.: US 10,944,702 B2
(45) Date of Patent: Mar. 9, 2021

(54) METHOD AND DEVICE FOR PUBLISHING MESSAGE AND STORAGE MEDIUM

(71) Applicant: Tencent Technology (Shenzhen) Company Limited, Shenzhen (CN)

(72) Inventors: Jia Tao, Shenzhen (CN); Heng Ye, Shenzhen (CN); Chen Wang, Shenzhen (CN); Wei Hu, Shenzhen (CN); Kaidi Wei, Shenzhen (CN); Qiang Li, Shenzhen (CN); Danyan Luo, Shenzhen (CN); Baohua Liu, Shenzhen (CN); Biqing Guo, Shenzhen (CN); Zekai Liao, Shenzhen (CN); Fengjie Chen, Shenzhen (CN); Liwei Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 95 days.

(21) Appl. No.: 15/949,327

(22) Filed: Apr. 10, 2018

(65) Prior Publication Data

US 2018/0227253 A1 Aug. 9, 2018

Related U.S. Application Data

(63) Continuation of application No. PCT/CN2017/071964, filed on Jan. 20, 2017.

(30) Foreign Application Priority Data

Jan. 22, 2016 (CN) .......................... 201610046548.9

(51) Int. Cl.
*H04L 12/58* (2006.01)
*H04L 29/08* (2006.01)

(52) U.S. Cl.
CPC ............ *H04L 51/063* (2013.01); *H04L 51/04* (2013.01); *H04L 51/16* (2013.01); *H04L 67/30* (2013.01)

(58) Field of Classification Search
CPC ....... H04L 51/063; H04L 51/04; H04L 67/30; H04L 51/16
See application file for complete search history.

(56) References Cited

U.S. PATENT DOCUMENTS

2008/0028027 A1 1/2008 Jachner
2010/0229127 A1* 9/2010 Williams .............. G06F 3/0482
715/854

(Continued)

FOREIGN PATENT DOCUMENTS

CN 101496363 A 7/2009
CN 101605109 A 12/2009

(Continued)

OTHER PUBLICATIONS

International Search Report for corresponding application No. PCT/CN2017/071964 filed Jan. 20, 2017; dated Apr. 11, 1017.

(Continued)

*Primary Examiner* — Soe Hlaing
(74) *Attorney, Agent, or Firm* — Anova Law Group, PLLC

(57) ABSTRACT

A method and device for publishing at least one message and a storage medium is provided. The method includes the following steps. A first message published by a first session account in a first session of an instant messaging client is acquired, and session accounts participating in the first session include at least three session accounts containing the first session account, and the first message is used for allowing reply information of at least one reply of at least one session account participating in the first session to the (Continued)

first message to be displayed in the first message. And the first message is displayed in the first session.

17 Claims, 7 Drawing Sheets

(56) References Cited

U.S. PATENT DOCUMENTS

| | | | | |
|---|---|---|---|---|
| 2011/0289428 | A1* | 11/2011 | Yuen | H04L 51/04 |
| | | | | 715/752 |
| 2013/0066984 | A1* | 3/2013 | Shin | H04L 12/1854 |
| | | | | 709/206 |
| 2013/0097260 | A1* | 4/2013 | Lee | H04W 4/00 |
| | | | | 709/206 |
| 2015/0052421 | A1* | 2/2015 | Thomson | G06F 16/958 |
| | | | | 715/206 |
| 2016/0218998 | A1* | 7/2016 | Sheth | G06F 3/04842 |

FOREIGN PATENT DOCUMENTS

| | | | |
|---|---|---|---|
| CN | 103269303 | A | 8/2013 |
| CN | 104052655 | A | 9/2014 |
| CN | 104079473 | A | 10/2014 |
| CN | 104660495 | A | 5/2015 |
| CN | 104734940 | A | 6/2015 |
| CN | 105207886 | A | 12/2015 |
| CN | 105530174 | A | 4/2016 |
| EP | 2950486 | A1 | 12/2015 |

OTHER PUBLICATIONS

Indian Patent Office Examination report for Application No. 201747042814 dated Sep. 30, 2020 6 pages.

* cited by examiner

METHOD AND DEVICE FOR PUBLISHING MESSAGE AND STORAGE MEDIUM

CROSS REFERENCE TO RELATED APPLICATIONS

This application is a continuation of International Patent Application Number PCT/CN2017/071964 filed on Jan. 20, 2017 which claims priority to Chinese Patent Application Number 201610046548.9 filed on Jan. 22, 2016, the contents of which said applications are herein incorporated by reference in their entirety.

TECHNICAL FIELD

The present disclosure relates to the field of instant messaging, and in particular to a method and device for publishing at least one message and a storage medium.

BACKGROUND

In an existing instant messaging client, at least one message published by each participant participating in a session is independent. Even though at least one message published by a certain participant of the session is at least one reply to a certain message which has been published, the at least one reply is also at least one message of the same type as the at least one message, published by the certain participant, to which the at least one reply is given. It is impossible to trace back to the at least one message to which the at least one reply is given according to contents of the at least one reply. And all messages in the session are required to be viewed one by one. Therefore, efficiency of viewing reply information of a certain message in the session of the instant messaging client is lower.

For the above problem, no effective solution has been provided yet.

SUMMARY

In an embodiment of the present disclosure, a method for publishing at least one message is provided, which includes that:

a first message published by a first session account in a first session of an instant messaging client is acquired, and session accounts participating in the first session include at least three session accounts including the first session account, and the first message is used for allowing reply information of at least one reply of at least one session account participating in the first session to the first message to be displayed in the first message; and the first message is displayed in the first session.

In another embodiment of the present disclosure, a device for publishing at least one message is further provided, which includes: a first acquisition element, arranged to acquire a first message published by a first session account in a first session of an instant messaging client, and session accounts participating in the first session includes at least three session accounts containing the first session account, and the first message is used for allowing reply information of at least one reply of at least one session account participating in the first session to the first message to be displayed in the first message; and a first display element, arranged to display the first message in the first session.

In another embodiment of the present disclosure, a storage medium is further provided, which is arranged to store a program code used for executing the following steps: a first message published by a first session account in a first session of an instant messaging client is acquired, and session accounts participating in the first session may include at least three session accounts containing the first session account, and the first message is used for allowing reply information of at least one reply of at least one session account participating in the first session to the first message to be displayed in the first message; and the first message is displayed in the first session.

DETAILED DESCRIPTION

Figure 1:
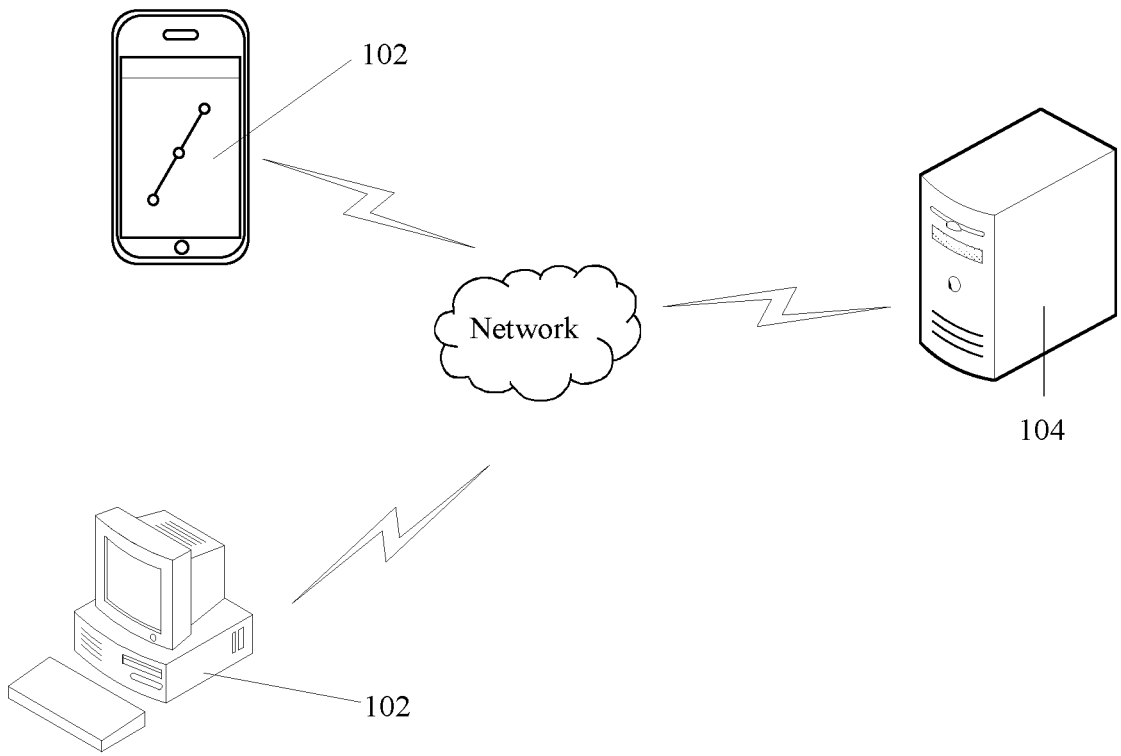
FIG. 1 is a schematic diagram of a hardware environment system according to an embodiment of the present disclosure.

At least some embodiments of the present disclosure provide a method and device for publishing at least one message and a storage medium, so as at least to partially solve a technical problem of lower efficiency of viewing reply information in a session of an instant messaging client.

In the embodiments of the present disclosure, the first message published by the first session account in the first session of the instant messaging client is acquired, and the session accounts participating in the first session include the at least three session accounts containing the first session account, and the first message is used for allowing the reply information of the at least one reply of the at least one session account participating in the first session to the first message to be displayed in the first message; and the first message is displayed in the first session. The technical problem of lower efficiency of viewing the reply information in the session of the instant messaging client is solved, and a technical effect of improving the efficiency of viewing the reply information is achieved.

In order to make the solutions of the present disclosure better understood by those skilled in the art, the technical solutions in the embodiments of the present disclosure will be clearly and completely described below in combination with the drawings in the embodiments of the present disclosure. Obviously, the described embodiments are not all embodiments but part of embodiments of the present disclosure. All other embodiments obtained by those skilled in the art on the basis of the embodiments in the present disclosure without creative work shall fall within the scope of protection of the present disclosure.

It is important to note that terms "first", "second" and the like in the specification, claims and drawings of the present disclosure are adopted not to describe a specific sequence or order but to distinguish similar objects. It should be understood that data used like this can be exchanged under a proper condition for implementation of the embodiments of the present disclosure described here in a sequence except those shown or described herein. In addition, terms "include" and "have" and any transformation thereof are intended to cover nonexclusive inclusions. For example, a process, method, system, product or device including a series of steps or elements is not limited to those steps or elements which are clearly listed, but includes other steps or elements which are not clearly listed or intrinsic to the process, the method, the product or the device.

Embodiment One

A method embodiment of the present disclosure which is executed by a device embodiment of the present disclosure is provided. It is important to note that the steps shown in the flowchart of the drawings are executed in a computer system, such as a group of computers, capable of executing instructions. And moreover, although a logical sequence is shown in the flowchart, the shown or described steps are executed in a sequence different from the sequence shown here under some conditions.

In an embodiment of the present disclosure, a method for publishing at least one message is provided.

Optionally, in the embodiment, the method for publishing the at least one message is applied to a hardware environment, shown in FIG. 1, formed by a terminal 102 and a server 104. As shown in FIG. 1, the terminal 102 is connected with the server 104 through a network, the network includes, but not limited to, a mobile communication network, a wide area network, a metropolitan area network or a local area network. The terminal 102 is one of a mobile phone terminal, a Personal Computer (PC) terminal, a notebook computer terminal and a tablet computer terminal.

A main working principle of a hardware environment system shown in FIG. 1 is as follows. A first message is published in an instant messaging client of the terminal 102, and the first message is used for allowing reply information of at least one reply of at least one session account participating in a first session to the first message to be displayed in the first message. The first message is stored in the server 104. The at least one session account participating in the first session gives at least one comment and at least one reply to the first message. The at least one comment and the at least one reply are stored in the server 104, and are also viewed by the at least one session account participating in the first session.

Figure 2:
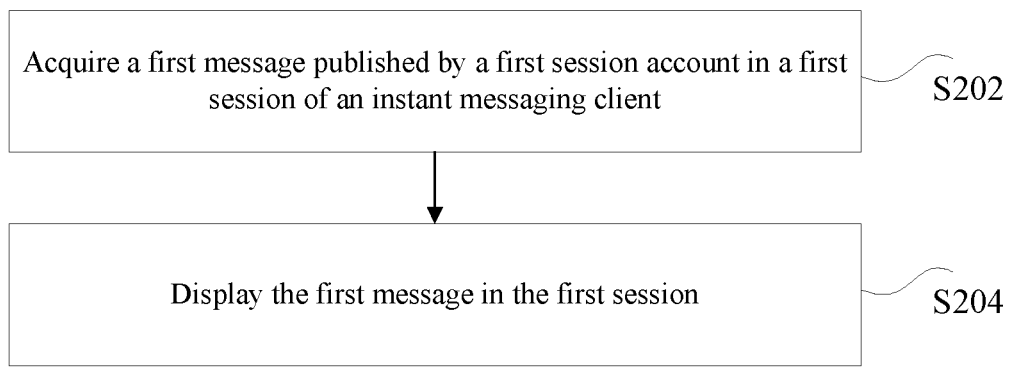
FIG. 2 is a flowchart of a method for publishing at least one message according to an embodiment of the present disclosure.

FIG. 2 is a flowchart of a method for publishing at least one message according to an embodiment of the present disclosure. The method for publishing the at least one message provided by the embodiment of the present disclosure will be specifically introduced below in combination with FIG. 2. As shown in FIG. 2, the method for publishing the at least one message includes the following steps.

At Step S202, a first message published by a first session account in a first session of an instant messaging client is acquired, and session accounts participating in the first session include at least three session accounts containing the first session account, and the first message is used for allowing reply information of at least one reply of at least one session account participating in the first session to the first message to be displayed in the first message.

At least three session accounts are included in the first session, and any account in the at least three session accounts publish the first message. The session account publishing the first message is determined as the first session account. The first message includes a topic type message. The first message allows the at least one session account participating in the first session to give at least one reply to the first message. That is, at least one session account participating in the first session gives at least one reply to the first message, the first message has a reply message receiving and displaying capability, and the reply information for the first message is displayed in the first message.

At Step S204, the first message is displayed in the first session.

The first message is displayed in the first session. The displayed first message includes two display areas. The first display area displays a content of the first message, and the second display area displays the reply information of the reply to the first message.

Specifically, the first message includes: a topic type message, and the step that the first message is displayed in the first session includes that: a topic content of the topic type message is displayed in the first display area of the first message; and reply information of a reply to the topic content is displayed in the second display area of the first message.

The topic type message is one of a message including words, an article, a message including at least one picture, a message including music, a message including at least one video and the like. The rely information of the reply of the session account participating in the first session to the topic type message is displayed in the session together with a topic content of the topic type message.

According to the embodiment, the first message is published in the first session. And the difference from the related art is that the first message is used for allowing the reply information of the at least one reply of the at least one session account participating in the first session to the first message to be displayed in the first message and the content of the first message and the reply information for the first message are both displayed in the first session. Furthermore, the reply information for the first message follows the first message, and no matter whether the first message is displayed in a current page of the first session or not, the reply information for the first message is viewed at the same time when the first message is viewed, and is not covered by another message in the first session, so that efficiency of viewing the reply information in the first session is improved, and the technical problem of lower efficiency of viewing the reply information in the session of the instant messaging client is solved.

Furthermore, the first message and the reply information for the first message are both implemented in the first session, and are oriented to all the accounts participating in the first session. The accounts participating in the first session have a private relation chain and something in common, so that publishing the first message in the first session ensures that the first message is private, and the first message published in the first session receives the reply information more easily.

For example, in a classmate group of Class 5, Grade 3 in a junior middle school, a student A (i.e. the first session account) publishes a first message, of which a content is "Invitation for Class 5, Grade 3, we will have a party on the third day of the first month in the Chinese calendar, will you join us?". The first message is used for allowing at least one session account participating in the first session to give at least one reply. A student B gives a reply "Long time no see, I will surely attend!" (i.e. reply information) to the first message. A session account C gives a reply "Sorry, I can't attend" (i.e. reply information) to the first message. The student A gives a reply "I will attend" to the first message. These reply information is all allowed to be displayed in the first message.

Optionally, the step that the first message is displayed in the first session includes at least one of that: a quantity of reply information of replies to the first message is displayed in the first session; and a quantity of attentions to the first message is displayed in the first session.

Figure 3:
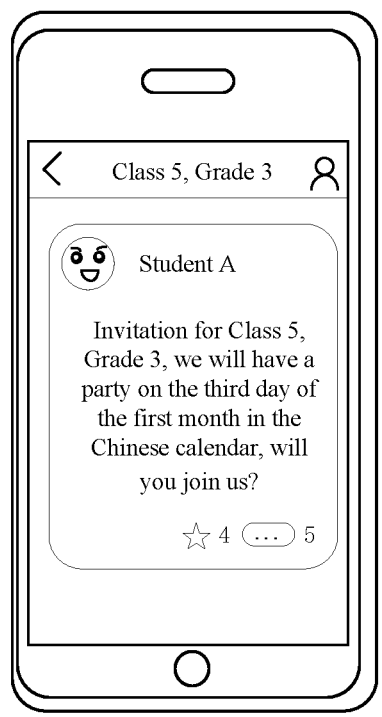
FIG. 3 is an interface diagram of a first message in a first session according to an embodiment of the present disclosure.

As shown in FIG. 3, the student A publishes the first message, a quantity five of the reply information is displayed at an ellipsis in a right lower corner of the first message. A quantity four of attentions is displayed at a five-pointed star in the right lower corner, and the quantity of the attentions are also a quantity of likes. The reply information in the first message is viewed by clicking the "ellipsis" in FIG. 3. It is important to note that the ellipsis and five-pointed star shown in FIG. 3 are adopted for schematic descriptions, and other representation forms also adopted here as an identifier of the quantity of the reply information and an identifier of the quantity of the attentions. For example, the ellipsis is replaced with a character or "+" and the five-pointed star is replaced with a heart shape, which will not be described one by one herein.

Optionally, the step that the first message is displayed in the first session includes that: the content of the first message is displayed in the first session; or part of the content of the first message is displayed in the first session, and a content expansion identifier is displayed, and the content expansion identifier is used for displaying the content of the first message in the first session when the content expansion identifier is clicked.

Figure 4:
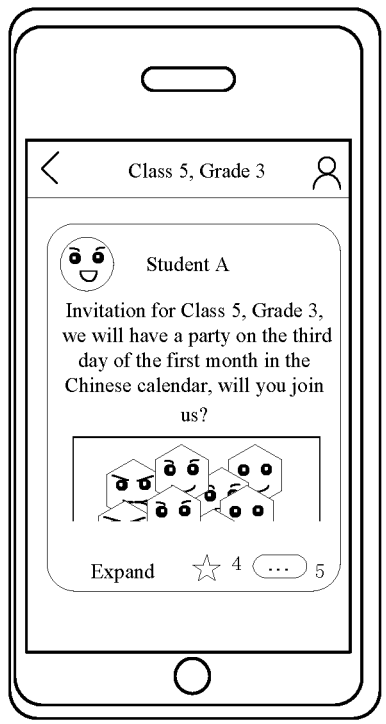
FIG. 4 is an interface diagram of displaying part of a first message in a first session according to an embodiment of the present disclosure.
Figure 5:
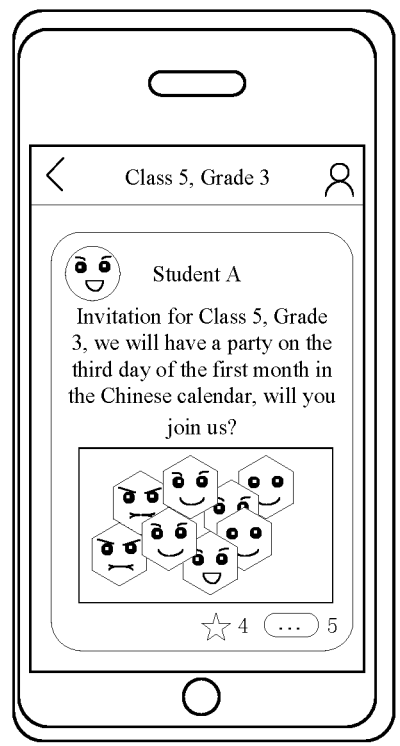
FIG. 5 is an interface diagram of displaying all of a first message in a first session according to an embodiment of the present disclosure.

The first message includes characters, a picture, an audio, a video and the like, and if the content of the first message is shorter, for example, a quantity of the characters is smaller than 100, all of the content of the first message is displayed in the first session, as shown in FIG. 3. If the content of the first message is longer, part of the content of the first message is displayed in the first session, as shown in FIG. 4. Moreover, the first message shown in FIG. 4 includes not only the characters but also the picture, and the picture is not completely displayed. A content expansion identifier is further displayed in a left lower corner of the first message shown in FIG. 4, i.e. "expand". When "expand" shown in FIG. 4 is clicked, all of the content of the first message is displayed, as shown in FIG. 5, and the expanded first message displays all the characters and complete picture of the first message.

It is important to note that: in the embodiment, the first message is published in the following manners.

One, an identifier used for publishing the first message in a data card of the first session is clicked, such as an identifier of "topic" in the data card. And the data card is used for describing the first session, and is determined as a name card of the first session. And "topic" is triggered by the data card to enter an album of the first session and view an announcement, activity and the like in the first session.

Figure 6:
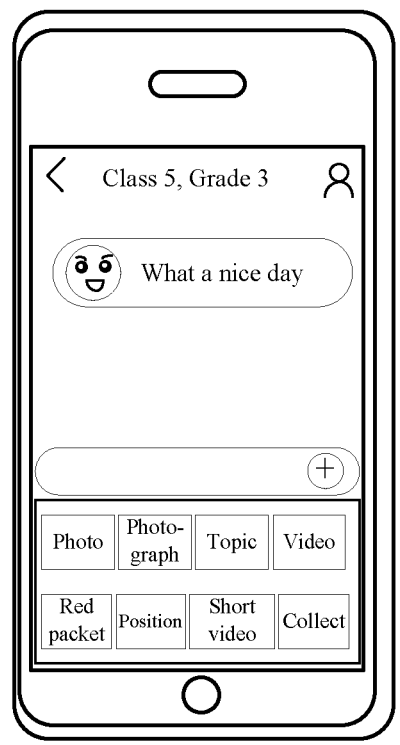
FIG. 6 is an interface diagram of publishing a first message through a plus entry according to an embodiment of the present disclosure.

Two, a "+" entry at an input box in the first session, as shown in FIG. 6, is clicked. And the "+" entry is determined as an entry of multiple functions, such as a topic, a voice, a picture, a short video and the like.

Figure 7:
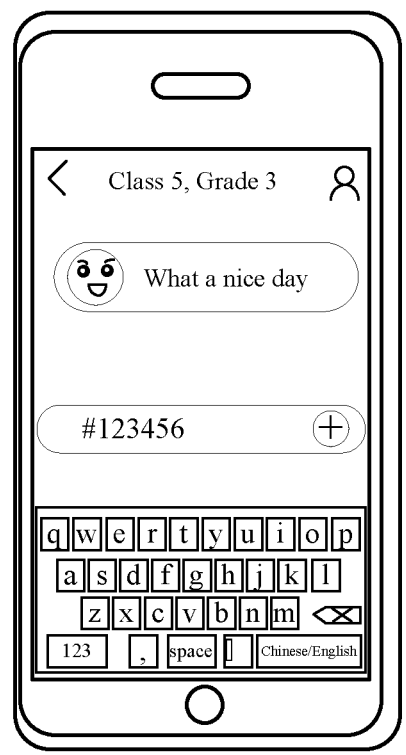
FIG. 7 is an interface diagram of publishing a first message through a shortcut symbol according to an embodiment of the present disclosure.

Three, a quick publishing function is selected. And for example, a character "#" is input in the input box in the first session, and is used for representing that a content input after "3" is determined as the first message, as shown in FIG. 7.

Figure 8:
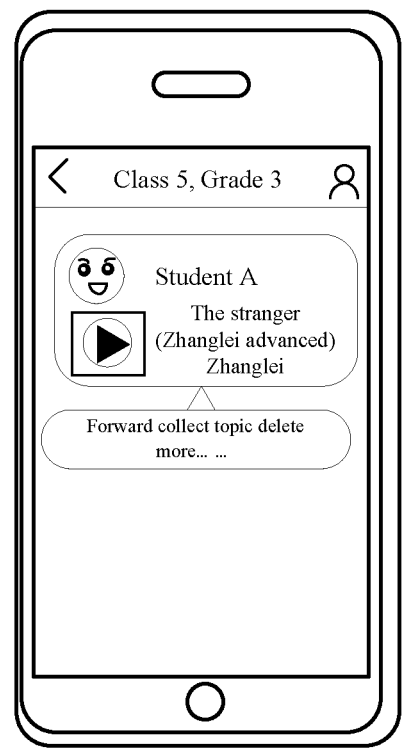
FIG. 8 is an interface diagram of converting a message in a session into a first message according to an embodiment of the present disclosure.

Four, information which has been published in the first session is converted into the first message. As shown in FIG. 8, an audio file "The stranger" sent by the student A is clicked, "topic" is clicked in a popped-up floating box to convert the audio file "The stranger" into a topic. And a text description is also added on such a basis, for example, "Do you think this song is very nice?", thereby forming the first message allowing the session accounts to give replies to the audio file.

When the first message is published, if the quantity of the characters of the first message exceeds an upper limit of the first message, a prompt about that the quantity of the characters exceeds the limit is sent, such as a text prompt like a prompt in a special color. If the picture in the published first message exceeds a specified size of a first picture, the picture is cropped from top to bottom.

Optionally, after the step that the first message is displayed in the first session, the method further includes that: at least one reply viewing operation over the first message displayed in the first session is detected; and the reply information of the at least one reply of the at least one session account participating in the first session to the first message is displayed.

The reply viewing operation is an operation triggered by clicking the first message. As shown in FIG. 3 to FIG. 5, the reply viewing operation is triggered by clicking the displaying area displaying the content in the first message and clicking the display area (such as the ellipsis and five-pointed star in FIG. 3 to FIG. 5) displaying the reply information.

The reply viewing operation over the first message is initiated by the first session account, and is also initiated by another session account participating in the first session. The session account participating in the first session initiates the reply viewing operation through different paths, and after the reply viewing operation is detected, reply messages of the replies to the first message are displayed.

After the reply is given to the first message, prompting information is displayed on a terminal interface of the first session account initiating the first message, and the prompting information appears on an interface of the first session of the terminal, an interface of the data card or an interface of "topic". There are further included two to conditions for appearance of the prompting information on the interface of the first session. One is that a prompt box appears at an upper position on a right side of the interface of the first session, and the other is that first reply information (which will be described hereinafter in detail, and will not be elaborated herein) is displayed in the first session. The prompting information adopts a red dot to represent that there is a new reply to be read.

The prompting information of the other session account participating in the first session is that the first reply information is displayed in the first session, and is also displayed in an interface of a latest session record of the instant messaging client.

When the reply message is displayed, two display manners are adopted. One is displaying in the first session, and the other is displaying in a page corresponding to the first message. That is, the operation that the reply information of the at least one reply of the at least one session account participating in the first session to the first message includes that: the reply information is displayed in the first message in the first session; or the reply information is displayed in the page corresponding to the first message.

Figure 9:
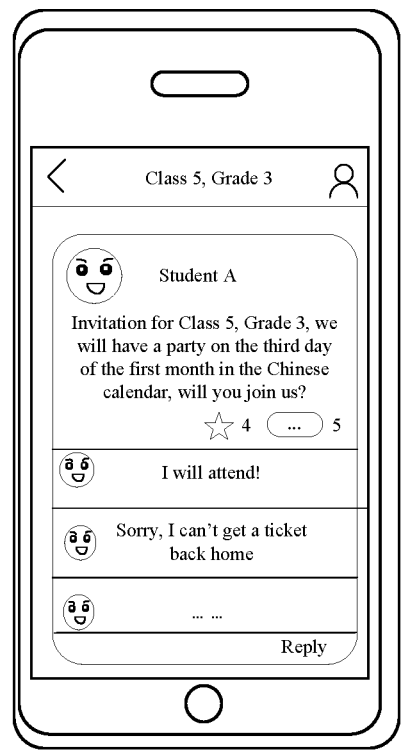
FIG. 9 is an interface diagram of displaying reply information in a first session according to an embodiment of the present disclosure.

As shown in FIG. 9, the first message is expanded in the first session, the content of the first message is displayed in the first display area, and the reply information is displayed in the second display area.

Figure 10:
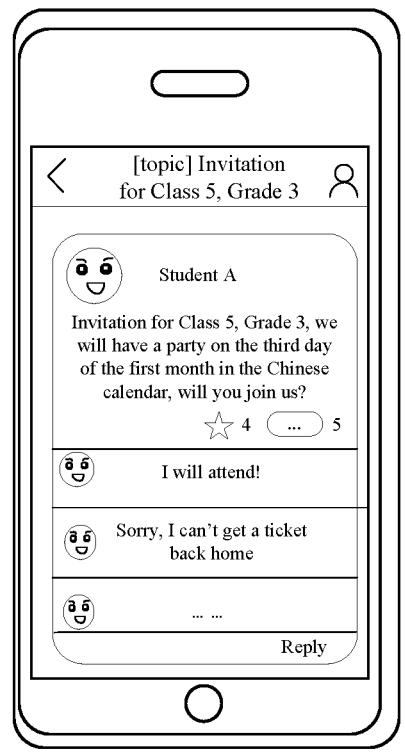
FIG. 10 is an interface diagram of displaying reply information in an interface corresponding to a first message according to an embodiment of the present disclosure.

FIG. 10 shows the page corresponding to the first message, and the reply information of the reply to the first message is displayed in the page. The at least one session account participating in the first session continues giving at least one reply to the first message in the page shown in FIG. 10, or give at least one further reply to the reply information, and the at least one further reply to the reply information is also determined as part of the first message, and is also displayed in the first session.

Optionally, after the step that the first message is displayed in the first session, the method further includes that: at least one reply request operation of giving the at least one reply to the first message displayed in the first session is detected; first reply information corresponding to the at least one reply request operation is acquired; and the first reply information is updated in the first message to determine the first reply information as one of the reply information in the first message.

The at least one reply request operation is triggered by clicking the ellipsis in FIG. 3 to FIG. 5, and is also triggered by clicking a reply identifier "reply" in FIG. 9 and FIG. 10. The first reply information is reply information of a reply to the first message, and the first reply information is updated in the first message. There is reply information in the first message, and the replies of the session accounts participating in the first session are all updated in the first message. When the session accounts participating in the first session view the first message, all the reply messages of the replies of the session accounts participating in the first session to the first message are also viewed. The reply information for the first message is all displayed in the first message, so that convenience for viewing the replies to the first message is improved. Particularly in discussion about a certain topic, discussion efficiency is improved.

After the at least one session account participating in the first session give the at least one reply to the first message, a second message is generated, and the second message is displayed in the first session. That is, after the step that the first message is displayed in the first session, the method further includes that: a second message is displayed in the first session, and the second message is generated by a server according to the reply information of the at least one reply of the at least one session account participating in the first session to the first message, and the second message includes at least one reply content of the at least one reply of the at least one session account participating in the first session to the first message and description information of the first message.

Figure 11:
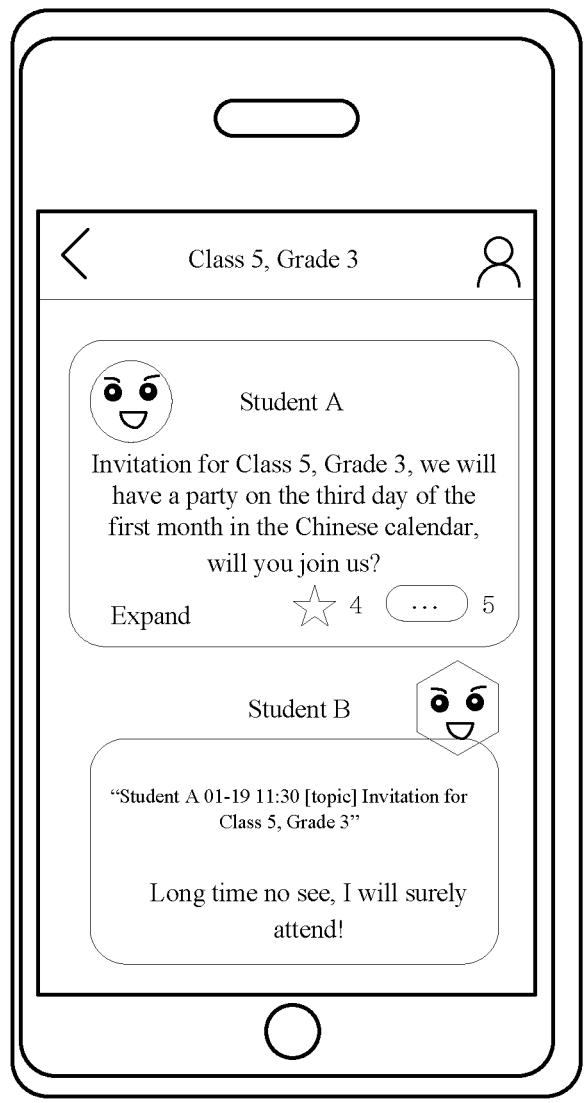
FIG. 11 is an interface diagram of displaying first reply information in a first session according to an embodiment of the present disclosure.

As shown in FIG. 11, the student B publishes first reply information, and a content of a reply of the student B is allowed to be displayed in the first message. That is, the first reply information is updated in the first message. Meanwhile, the server generates a second message according to the first reply information, and the second message includes a content of the first reply information and description information of the first message to which the student B gives the reply. The second message is displayed in a second session, and realizes a prompting function of prompting the at least one session accounts participating in the first session that there is a participant giving the at least one reply to the first message.

As shown in FIG. 11, "Student A 01-10 11:30 [topic] Invitation for Class 5, Grade 3" is displayed in the second message, and the content is the description information of the first message, including the session account publishing the first message, time when the first message is published and a general content of the first message. The content of the reply of the student B, i.e. "Long time no see, I will surely attend!", is also displayed in the second message.

Optionally, after the step that the second messages are displayed in the first session, the method further includes that: a skipping request used for indicating skipping to the first message is received through the second message; and skipping to a position where the first message is displayed in the first session is executed according to the skipping request.

After the second message is clicked, skipping to the position where the first message is displayed in the first session is executed. Not only is a topic type message such as the first message be published in the first session, but also another ordinary message is published, so that the published first message is very likely to be moved out of the current page by the other ordinary message or the second message. For example, after the student A publishes the first message, the first message is moved out of the current page by another message, and is not viewed in the current page. If being required to view the first message, the at least one session account participating in the first session skips to the position where the first message is displayed in the first session through the second message, thereby viewing the first message. By the embodiment, viewing of the first message from the first session, replying to the first message and viewing the reply information of the reply to the first message is conveniently implemented, and the topic discussion efficiency is improved.

The at least one session account participating in the first session also views the first message in another manner, for example, the topic entry on the data card, which will not be described with examples one by one herein.

It is important to note that: for simple description, each of the abovementioned method embodiment is expressed as a combination of a series of actions. However, those skilled in the art should know that the present disclosure is not limited to a described action sequence because some steps are executed in another sequence or at the same time according to the present disclosure. Second, those skilled in the art should also know that the embodiments described in the specification all belong to exemplary embodiments and involved actions and components are optional for the present disclosure.

From the above descriptions about the implementation modes, those skilled in the art should clearly know that the method according to the embodiment is implemented in a manner of combining software and a necessary universal hardware platform, and of course, is also implemented by hardware, and the former is a better implementation mode under many conditions. Based on such an understanding, the technical solution of the present disclosure substantially or a part making contributions to the related art is embodied in form of software product, and the computer software product is stored in a storage medium (such as a Read-Only Memory (ROM)/Random Access Memory (RAM), a magnetic disk and an optical disk), including a plurality of instructions arranged to enable a terminal device (which is a mobile phone, a computer, a server, network equipment or the like) to execute the method of each embodiment of the present disclosure.

Embodiment Two

In another embodiment of the present disclosure, a device for publishing at least one message, which is arranged to implement the abovementioned method for publishing the at least one message, is further provided. The device for publishing the at least one message is arranged to execute the method for publishing the at least one message provided by the abovementioned content of the embodiment of the present disclosure. The device for publishing the at least one message provided by the embodiment of the present disclosure will be specifically introduced below.

Figure 12:
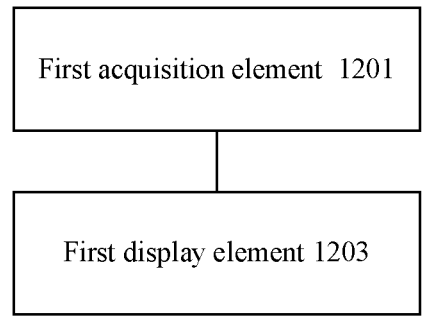
FIG. 12 is a schematic diagram of a device for publishing at least one message according to an embodiment of the present disclosure.

FIG. 12 is a schematic diagram of a device for publishing at least one message according to an embodiment of the present disclosure. As shown in FIG. 12, the device for publishing the at least one message includes the following elements.

A first acquisition element 1201 is arranged to acquire a first message published by a first session account in a first session of an instant messaging client, and session accounts participating in the first session include at least three session accounts containing the first session account, and the first message is used for allowing reply information of at least one reply of at least one session account participating in the first session to the first message to be displayed in the first message.

At least three session accounts are included in the first session, and any account in the at least three session accounts may publish the first message. The session account publishing the first message is determined as the first session account. The first message includes a topic type message. The first message allows the at least one session account participating in the first session to give at least one reply to the first message. That is, at least one session account participating in the first session gives at least one reply to the first message, the first message has a reply message receiving and displaying capability, and the reply information for the first message is displayed in the first message.

A first display element 1203 is arranged to display the first message in the first session.

The first message is displayed in the first session. The displayed first message includes two display areas. The first display area displays a content of the first message, and the second display area displays the reply information of the reply to the first message.

Specifically, the first message includes: a topic type message, and the first display element includes: a content display component, arranged to display a topic content of the topic type message in the first display area of the first message; and a reply display component, arranged to display reply information of a reply to the topic content in the second display area of the first message.

The topic type message is one of a message including words, an article, a message including at least one picture, a message including music, a message including at least one video and the like. The rely information of the reply of the session account participating in the first session to the topic type message is displayed in the session together with a topic content of the topic type message.

According to the embodiment, the first message is published in the first session. And the difference from the related art is that the first message is used for allowing the reply information of the at least one reply of the at least one session account participating in the first session to the first message to be displayed in the first message and the content of the first message and the reply information for the first message are both displayed in the first session. Furthermore, the reply information for the first message follows the first message, and no matter whether the first message is displayed in a current page of the first session or not, the reply information for the first message is viewed at the same time when the first message is viewed, and is not covered by another message in the first session, so that efficiency of viewing the reply information in the first session is improved, and the technical problem of lower efficiency of viewing the reply information in the session of the instant messaging client is solved.

Furthermore, the first message and the reply information for the first message are both implemented in the first session, and are oriented to all the accounts participating in the first session. The accounts participating in the first session have a private relation chain and something in common, so that publishing the first message in the first session ensures that the first message is private, and the first message published in the first session receives the reply information more easily.

For example, in a classmate group of Class 5, Grade 3 in a junior middle school, a student A (i.e. the first session account) publishes a first message, of which a content is "Invitation for Class 5, Grade 3, we will have a party on the third day of the first month in the Chinese calendar, will you join us?". The first message is used for allowing at least one session account participating in the first session to give at least one reply. A student B gives a reply "Long time no see, I will surely attend!" (i.e. reply information) to the first message. A session account C gives a reply "Sorry, I can't attend" (i.e. reply information) to the first message. The student A gives a reply "I will attend" to the first message. These reply information is all allowed to be displayed in the first message.

Optionally, the first display element includes at least one of: a third display component, arranged to display a quantity of reply information of replies to the first message in the first session; and a fourth display component, arranged to display a quantity of attentions to the first message in the first session.

As shown in FIG. 3, the student A publishes the first message, a quantity five of the reply information is displayed at an ellipsis in a right lower corner of the first message. A quantity four of attentions is displayed at a five-pointed star in the right lower corner, and the quantity of the attentions are also a quantity of likes. The reply information in the first message is viewed by clicking the "ellipsis" in FIG. 3. It is important to note that the ellipsis and five-pointed star shown in FIG. 3 are adopted for schematic descriptions, and other representation forms also adopted here as an identifier of the quantity of the reply information and an identifier of the quantity of the attentions. For example, the ellipsis is replaced with a character or "+" and the five-pointed star is replaced with a heart shape, which will not be described one by one herein.

Optionally, the first display element includes: a first display component, arranged to display the content of the first message in the first session; or a second display component, arranged to display part of the content of the first message in the first session, and display a content expansion identifier, and the content expansion identifier is used for displaying the content of the first message in the first session when the content expansion identifier is clicked.

The first message includes characters, a picture, an audio, a video and the like, and if the content of the first message is shorter, for example, a quantity of the characters is smaller than 100, all of the content of the first message is displayed in the first session, as shown in FIG. 3. If the content of the first message is longer, part of the content of the first message is displayed in the first session, as shown in FIG. 4. Moreover, the first message shown in FIG. 4 includes not only the characters but also the picture, and the picture is not completely displayed. A content expansion identifier is further displayed in a left lower corner of the first message shown in FIG. 4, i.e. "expand". When "expand" shown in FIG. 4 is clicked, all of the content of the first message is displayed, as shown in FIG. 5, and the expanded first message displays all the characters and complete picture of the first message.

It is important to note that: in the embodiment, the first message is published in the following manners.

One, an identifier used for publishing the first message in a data card of the first session is clicked, such as an identifier of "topic" in the data card. And the data card is used for describing the first session, and is determined as a name card of the first session. And "topic" is triggered by the data card to enter an album of the first session and view an announcement, activity and the like in the first session.

Two, a "+" entry at an input box in the first session, as shown in FIG. 6, is clicked. And the "+" entry is determined as an entry of multiple functions, such as a topic, a voice, a picture, a short video and the like.

Three, a quick publishing function is selected. And for example, a character "#" is input in the input box in the first session, and is used for representing that a content input after "3" is determined as the first message, as shown in FIG. 7.

Four, information which has been published in the first session is converted into the first message. As shown in FIG. 8, an audio file "The stranger" sent by the student A is clicked, "topic" is clicked in a popped-up floating box to convert the audio file "The stranger" into a topic. And a text description is also added on such a basis, for example, "Do you think this song is very nice?", thereby forming the first message allowing the session accounts to give replies to the audio file.

When the first message is published, if the quantity of the characters of the first message exceeds an upper limit of the first message, a prompt about that the quantity of the characters exceeds the limit is sent, such as a text prompt like a prompt in a special color. If the picture in the published first message exceeds a specified size of a first picture, the picture is cropped from top to bottom.

Optionally, the device further includes: a first detection element, arranged to, after the first message is displayed in the first session, detect at least one reply viewing operation over the first message displayed in the first session; and a second display element, arranged to display the reply information of the at least one reply of the at least one session account participating in the first session to the first message.

The reply viewing operation is an operation triggered by clicking the first message. As shown in FIG. 3 to FIG. 5, the reply viewing operation is triggered by clicking the displaying area displaying the content in the first message and clicking the display area (such as the ellipsis and five-pointed star in FIG. 3 to FIG. 5) displaying the reply information.

The reply viewing operation over the first message is initiated by the first session account, and is also initiated by another session account participating in the first session. The session account participating in the first session initiates the reply viewing operation through different paths, and after the reply viewing operation is detected, reply messages of the replies to the first message are displayed.

After the reply is given to the first message, prompting information is displayed on a terminal interface of the first session account initiating the first message, and the prompting information appears on an interface of the first session of the terminal, an interface of the data card or an interface of "topic". There are further included two conditions for appearance of the prompting information on the interface of the first session. One is that a prompt box appears at an upper position on a right side of the interface of the first session, and the other is that first reply information (which will be described hereinafter in detail, and will not be elaborated herein) is displayed in the first session. The prompting information adopts a red dot to represent that there is a new reply to be read.

The prompting information of the other session account participating in the first session is that the first reply information is displayed in the first session, and is also displayed in an interface of a latest session record of the instant messaging client.

When the reply message is displayed, two display manners are adopted. One is displaying in the first session, and the other is displaying in a page corresponding to the first message. That is, the operation that the reply information of the at least one reply of the at least one session account participating in the first session to the first message includes that: the reply information is displayed in the first message in the first session; or the reply information is displayed in the page corresponding to the first message.

As shown in FIG. 9, the first message is expanded in the first session, the content of the first message is displayed in the first display area, and the reply information is displayed in the second display area.

FIG. 10 shows the page corresponding to the first message, and the reply information of the reply to the first message is displayed in the page. The at least one session account participating in the first session continues giving at least one reply to the first message in the page shown in FIG. 10, or give at least one further reply to the reply information, and the at least one further reply to the reply information is also determined as part of the first message, and is also displayed in the first session.

Optionally, the device further includes: a second detection element, arranged to, after the first message is displayed in the first session, detect at least one reply request operation of giving the at least one reply to the first message displayed in the first session; a second acquisition element, arranged to acquire first reply information corresponding to the at least one reply request operation; and an updating element, arranged to update the first reply information in the first message to determine the first reply information as one of the reply information in the first message.

The at least one reply request operation is triggered by clicking the ellipsis in FIG. 3 to FIG. 5, and is also triggered by clicking a reply identifier "reply" in FIG. 9 and FIG. 10. The first reply information is reply information of a reply to the first message, and the first reply information is updated in the first message. There is reply information in the first message, and the replies of the session accounts participating in the first session are all updated in the first message. When the session accounts participating in the first session view the first message, all the reply messages of the replies of the session accounts participating in the first session to the first message are also viewed. The reply information for the first message is all displayed in the first message, so that convenience for viewing the replies to the first message is improved. Particularly in discussion about a certain topic, discussion efficiency is improved.

After the at least one session account participating in the first session give the at least one reply to the first message, a second message is generated, and the second message is displayed in the first session. That is, the device further includes: a third display element, arranged to, after the first message is displayed in the first session, display a second message in the first session, and the second message is generated by a server according to the reply information of the at least one reply of the at least one session account participating in the first session to the first message, and the to second message includes at least one reply content of the at least one reply of the at least one session account participating in the first session to the first message and description information of the first message.

As shown in FIG. 11, the student B publishes first reply information, and a content of a reply of the student B is allowed to be displayed in the first message. That is, the first reply information is updated in the first message. Meanwhile, the server generates a second message according to the first reply information, and the second message includes a content of the first reply information and description information of the first message to which the student B gives the reply. The second message is displayed in a second session, and realizes a prompting function of prompting the at least one session accounts participating in the first session that there is a participant giving the at least one reply to the first message.

As shown in FIG. 11, "Student A 01-10 11:30 [topic] Invitation for Class 5, Grade 3" is displayed in the second message, and the content is the description information of the first message, including the session account publishing the first message, time when the first message is published and a general content of the first message.

The content of the reply of the student B, i.e. "Long time no see, I will surely attend!", is also displayed in the second message.

Optionally, the device further includes: a receiving element, arranged to, after the second messages are displayed in the first session, receive a skipping request used for indicating skipping to the first message through the second message; and a fourth display element, arranged to execute skipping to a position where the first message is displayed in the first session according to the skipping request.

After the second message is clicked, skipping to the position where the first message is displayed in the first session is executed. Not only is a topic type message such as the first message be published in the first session, but also another ordinary message is published, so that the published first message is very likely to be moved out of the current page by the other ordinary message or the second message. For example, after the student A publishes the first message, the first message is moved out of the current page by another message, and is not viewed in the current page. If being required to view the first message, the at least one session account participating in the first session skips to the position where the first message is displayed in the first session through the second message, thereby viewing the first message. By the embodiment, viewing of the first message from the first session, replying to the first message and viewing the reply information of the reply to the first message is conveniently implemented, and the topic discussion efficiency is improved.

The at least one session account participating in the first session also views the first message in another manner, for example, the topic entry on the data card, which will not be described with examples one by one herein.

Embodiment Three

Figure 13:
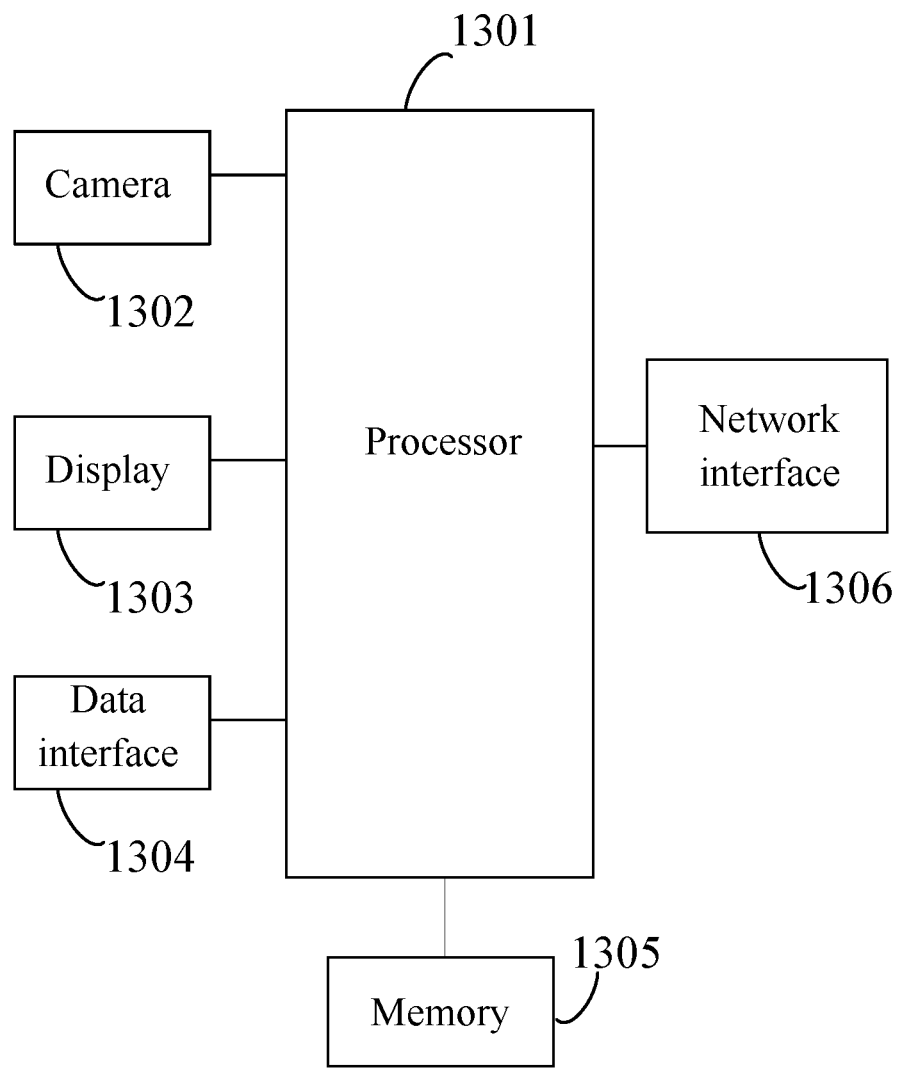
FIG. 13 is a structural diagram of a terminal according to an embodiment of the present disclosure.

In another embodiment of the present disclosure, a terminal arranged to implement the abovementioned method for publishing the at least one message is further provided. As shown in FIG. 13, the terminal includes a processor 1301, a camera 1302, a display 1303, a data interface 1304, a memory 1305 and a network interface 1306.

The camera 1302 is arranged to shoot at least one picture of each user participating in a first session.

The data interface 1304 transmits at least one picture, text, audio and video acquired by a third-party tool to the processor 1301 in a data transmission manner.

The memory 1305 is arranged to store at least one cache file in the first session.

The network interface 1306 is arranged to perform network communication with the server and send first reply information to the server.

The display 1303 is arranged to display an interface of an instant messaging client.

The processor 1301 is arranged to execute the following operations:

acquire a first message published by a first session account in a first session of an instant messaging client, and session accounts participating in the first session include at least three session accounts containing the first session account, and the first message is used for allowing reply information of at least one reply of at least one session account participating in the first session to the first message to be displayed in the first message; and displaying the first message in the first session.

Optionally, specific examples in the embodiment refer to examples described in Embodiment One and Embodiment Two, and will not be elaborated in the embodiment.

Embodiment Four

The embodiment of the present disclosure further provides a storage medium. Optionally, in the embodiment, the storage medium is arranged to store program codes for a method for publishing at least one message in an embodiment of the present disclosure.

Optionally, in the embodiment, the storage medium is located in at least one network device in multiple network devices in a network of a mobile communication network, a wide area network, a metropolitan area network or a local area network.

Optionally, in the embodiment, the storage medium is arranged to store program codes arranged to execute the following steps.

At S1, a first message published by a first session account in a first session of an instant messaging client is acquired, and session accounts participating in the first session include at least three session accounts containing the first session account, and the first message is used for allowing reply information of at least one reply of at least one session account participating in the first session to the first message to be displayed in the first message.

At S2, the first message is displayed in the first session.

Optionally, in the embodiment, the storage medium includes, but not limited to: various media capable of storing program codes, such as a U disk, a ROM, a RAM, a mobile hard disk, a magnetic disk or an optical disk.

Optionally, specific examples in the embodiment refer to examples described in Embodiment One and Embodiment Two, and will not be elaborated in the embodiment.

Sequence numbers of the embodiments of the present disclosure are adopted for description, and do not represent quality of the embodiments.

If being implemented in form of software function element and sold or used as an independent product, an integrated element in the embodiment is stored in a computer-readable storage medium. Based on such an understanding, the technical solutions of the present disclosure substantially or parts making contributions to the related art or all or part of the technical solutions are embodied in form of software product, and the computer software product is stored in a storage medium, including a plurality of instructions used for enabling at least one computer device (which is a personal computer, a server, network equipment or the like) to execute all or part of the steps of the method in each embodiment of the present disclosure.

In the embodiments of the present disclosure, each embodiment is described with different focuses, and parts which are not elaborated in a certain embodiment refer to related descriptions of the other embodiments.

In some embodiments provided by the present disclosure, it should be understood that the disclosed client is implemented in another manner, and the device embodiment described above is schematic. And for example, division of the elements is logic function division, and other division manners are adopted during practical implementation. For example, multiple elements or components are combined or integrated into another system, or some characteristics are neglected or not executed. In addition, coupling or direct coupling or communication connection between each displayed or discussed component is indirect coupling or communication connection, implemented through some interfaces, of the elements or the components, and is electrical or adopt other forms.

The elements described as separate parts are or are not physically separated, and parts displayed as elements are or are not physical elements, and namely are located in the same place, or are also distributed to multiple network elements. Part or all of the elements are selected to achieve the purpose of the solutions of the embodiments according to a practical requirement.

In addition, each function element in each embodiment of the present disclosure is integrated into a processing element, each element also exists independently, and two or more than two elements are also integrated into a element. The abovementioned integrated element is implemented in a hardware form, and is also implemented in form of hardware and software function element.

The above are the exemplary implementation modes of the present disclosure. It should be pointed out that those skilled in the art can further make a plurality of improvements and embellishments without departing from the scope protection as claimed in claims of the present disclosure and these improvements and embellishments shall also fall within the scope of protection of the present disclosure.

What is claimed is:

1. A method for publishing at least one message, comprising:
   acquiring a first message published by a first session account in a first session of an instant messaging client, wherein session accounts participating in the first session include at least three session accounts containing the first session account, and the first message is used for allowing reply information of at least one reply of at least one session account participating in the first session to the first message to be displayed in the first message and allowing at least one further reply to the reply information to be displayed in the first message;
   generating a second message according to the reply information after the at least one session account participating in the first session replies to the first message;
   displaying a first portion of the first message and a content expansion identifier in the first session, wherein a second portion of the first message is displayed in the first session upon the content expansion identifier's being triggered, wherein prior to displaying in the first session the first portion of the first message, the method further comprising:
      determining whether a quantity of characters or a picture size in the first message exceeds an upper limit
      upon determining the upper limit is exceeded, displaying a text prompt and
      upon receipt of an operation on the text prompt, displaying the first portion; and
   displaying the second message in the first session.

2. The method of claim 1, further comprising:
   displaying a quantity of reply messages replied to the first message in the first session; and
   displaying a quantity of attentions to the first message in the first session, wherein the quantity of attentions includes a quantity of likes.

3. The method of claim 1, wherein the method further comprises:
   detecting a reply viewing operation over the first message displayed in the first session; and
   displaying reply information of at least one reply of each session account participating in the first session to the first message.

4. The method of claim 1, wherein the method further comprises:
   detecting at least one reply request operation of giving the at least one reply to the first message displayed in the first session;
   acquiring first reply information corresponding to the at least one reply request operation; and
   including the first reply information in the reply information to the first message.

5. The method of claim 1, wherein the second message further includes description information of the first message.

6. The method of claim 5, wherein after displaying the second message in the first session, the method further comprises:
   receiving a skipping request used for indicating skipping to the first message through the second message; and
   executing skipping to a position where the first message is displayed in the first session according to the skipping request.

7. The method of claim 1, wherein the first portion of the first message includes an audio clip, the method further comprising:
- displaying a popped-up floating box after the audio clip is clicked on;
- selecting a topic option from options provided via the popped-up floating box;
- generating a text topic about the audio clip according to the topic option; and
- including the text topic in the first portion of the first message.

8. A device for publishing at least one message, comprising: a memory; and a processor coupled to the memory, the processor being configured to:
- acquire a first message published by a first session account in a first session of an instant messaging client, wherein session accounts participating in the first session include at least three session accounts containing the first session account, and the first message is used for allowing reply information of at least one reply of at least one session account participating in the first session to the first message to be displayed in the first message and allowing at least one further reply to the reply information to be displayed in the first message;
- display a first portion of the first message and a content expansion identifier in the first session, wherein a second portion of the first message is displayed in the first session upon the content expansion identifier's being triggered, wherein, prior to displaying in the first session the first portion of the first message, the processor is further configured to:
  - determine whether a quantity of characters or a picture size in the first message exceeds an upper limit
  - upon determining the upper limit is exceeded, display a text prompt and
  - upon receipt of an operation on the text prompt, display the first portion; and
- after the first message is displayed in the first session, display a second message in the first session, wherein the second message is generated by a server according to the reply information after the at least one session account participating in the first session replies to the first message.

9. The device of claim 8, wherein the processor is further configured to:
- display a quantity of reply messages replied to the first message in the first session; and
- display a quantity of attentions to the first message in the first session, wherein the quantity of attentions includes a quantity of likes.

10. The device of claim 8, wherein the processor is further configured to:
- detect a reply viewing operation over the first message displayed in the first session; and display reply information of at least one reply of each session account participating in the first session to the first message; or
- detect at least one reply request operation of giving the at least one reply to the first message displayed in the first session; acquire first reply information corresponding to the at least one reply request operation; and update include the first reply information in the reply information to the first message;
- wherein the second message further includes description information of the first message.

11. The device of claim 10, wherein the processor is further configured to:
- receive a skipping request used for indicating skipping to the first message through the second message; and
- execute skipping to a position where the first message is displayed in the first session according to the skipping request.

12. The device of claim 8, wherein the first portion of the first message includes an audio clip, and the processor is further configured to:
- display a popped-up floating box after the audio clip is clicked on;
- select a topic option from options provided via the popped-up floating box;
- generate a text topic about the audio clip according to the topic option; and
- include the text topic in the first portion of the first message.

13. A non-transitory computer readable medium storing program codes executable by at least one processor to perform:
- acquiring a first message published by a first session account in a first session of an instant messaging client, wherein session accounts participating in the first session include at least three session accounts containing the first session account, and the first message is used for allowing reply information of at least one reply of at least one session account participating in the first session to the first message to be displayed in the first message and allowing at least one further reply to the reply information to be displayed in the first message;
- generating a second message according to the reply information after the at least one session account participating in the first session replies to the first message;
- displaying a first portion of the first message and a content expansion identifier in the first session, wherein a second portion of the first message is displayed in the first session upon the content expansion identifier's being triggered, wherein the program codes are further executable by the at least one processor to perform, prior to displaying in the first session the first portion of the first message:
  - determining whether a quantity of characters or a picture size in the first message exceeds an upper limit
  - upon determining the upper limit is exceeded, displaying a text prompt and
  - upon receipt of an operation on the text prompt, displaying the first portion; and
- displaying the second message in the first session.

14. The non-transitory computer readable medium of claim 13, wherein the program codes are further executable by the at least one processor to perform:
- displaying a quantity of reply messages replied to the first message in the first session; and
- displaying a quantity of attentions to the first message in the first session, wherein the quantity of attentions includes a quantity of likes.

15. The non-transitory computer readable medium of claim 13, wherein the program codes are further executable by the at least one processor to perform:
- detecting a reply viewing operation over the first portion of the first message displayed in the first session; and displaying reply information of at least one reply of each session account participating in the first session to the first message; or
- detecting at least one reply request operation of giving the at least one reply to the first message displayed in the first session; acquiring first reply information corresponding to the at least one reply request operation; and including the first reply information in the reply information to the first message;

wherein the second message further includes description information of the first message.

16. The non-transitory computer readable medium of claim 15, wherein the program codes are further executable by the at least one processor to perform:

receiving a skipping request used for indicating skipping to the first message through the second message; and executing skipping to a position where the first message is displayed in the first session according to the skipping request.

17. The non-transitory computer readable medium of claim 13, wherein the first portion of the first message includes an audio clip, and wherein the program codes are further executable by the at least one processor to perform:

displaying a popped-up floating box after the audio clip is clicked on;

selecting a topic option from options provided via the popped-up floating box;

generating a text topic about the audio clip according to the topic option; and including the text topic in the first portion of the first message.

* * * * *